US007102311B2

(12) United States Patent
Nishimura et al.

(10) Patent No.: US 7,102,311 B2
(45) Date of Patent: Sep. 5, 2006

(54) DRIVE CONTROL METHOD AND DRIVE CONTROLLER

(75) Inventors: Tetsuhiko Nishimura, Hyogo (JP); Masatoshi Sano, Hyogo (JP); Yoshinori Kegasa, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/504,770

(22) PCT Filed: Feb. 18, 2003

(86) PCT No.: PCT/JP03/01685

§ 371 (c)(1),
(2), (4) Date: Jan. 3, 2005

(87) PCT Pub. No.: WO03/068464

PCT Pub. Date: Aug. 21, 2003

(65) Prior Publication Data

US 2005/0104549 A1 May 19, 2005

(30) Foreign Application Priority Data

Feb. 18, 2002 (JP) ............................ 2002-039761

(51) Int. Cl.
*H02P 1/22* (2006.01)
*H02P 1/40* (2006.01)

(52) U.S. Cl. ...................... 318/280; 318/283; 318/286; 318/560

(58) Field of Classification Search ........ 318/560–587, 318/280–286

See application file for complete search history.

(56) References Cited

U.S. PATENT DOCUMENTS

| 3,493,745 | A | * | 2/1970 | Brunnett et al. ............... 378/81 |
| 5,119,006 | A | | 6/1992 | Torii et al. |
| 5,150,452 | A | * | 9/1992 | Pollack et al. ............... 700/255 |
| 5,304,906 | A | * | 4/1994 | Arita et al. ............. 318/568.16 |
| 5,347,459 | A | * | 9/1994 | Greenspan et al. ......... 700/255 |
| 5,440,213 | A | * | 8/1995 | Arita et al. ............. 318/568.11 |
| 5,719,479 | A | * | 2/1998 | Kato et al. .................. 318/563 |
| 6,057,661 | A | * | 5/2000 | Iwashita ..................... 318/563 |
| 6,298,283 | B1 | * | 10/2001 | Kato et al. .................. 700/255 |
| 6,429,617 | B1 | * | 8/2002 | Sano et al. .................. 318/560 |

FOREIGN PATENT DOCUMENTS

GB 2 355 547 A 4/2001

(Continued)

OTHER PUBLICATIONS

Feddema, J.T. et al., "whole arm Obstacle avoidance for teleoperated Robots", May 1994, Sandia National Laboratories, IEEE, pp. 3303-3309.*

(Continued)

*Primary Examiner*—Rina Duda
*Assistant Examiner*—Tyrone Smith
(74) *Attorney, Agent, or Firm*—Marshall, Gerstein & Borun LLP

(57) ABSTRACT

A drive controller (10') of the present invention comprises control means (28, 29, 32 to 38) configured to perform control to cause a driven element to move by a driver (M) and a collision detecting means (20') configured to detect a collision of the driven element. The collision detecting means detects the collision of the driven element based on an estimated speed deviation which is an estimated deviation from an actual speed of the driven element or an estimated acceleration deviation which is an estimated deviation from an actual acceleration of the driven element.

16 Claims, 3 Drawing Sheets

FOREIGN PATENT DOCUMENTS

| | | |
|---|---|---|
| JP | 01-230107 | 9/1989 |
| JP | 03-281194 | 12/1991 |
| JP | 04-138088 | 5/1992 |
| JP | 05-084581 | 4/1993 |
| JP | 05-208394 | 8/1993 |
| JP | 07-143780 | 6/1995 |
| JP | 08-066893 | 3/1996 |
| JP | 08-229864 | 9/1996 |
| JP | 10-315173 | 12/1998 |
| JP | 11-070490 | 3/1999 |
| JP | 2000-052286 | 2/2000 |
| JP | 2001-117618 | 4/2001 |
| JP | 2001-202134 | 7/2001 |

OTHER PUBLICATIONS

International Search Report for International Application No. PCT/JP03/01685 by the Japanese Patent Office dated Apr. 16, 2003 (2 pages).

* cited by examiner

DRIVE CONTROL METHOD AND DRIVE CONTROLLER

CROSS-REFERENCE TO RELATED APPLICATION

This application is based on International Application No. PCT/JP03/01685 filed Feb. 18, 2003 which application was based on Japanese Patent Application filed Feb. 18, 2002.

TECHNICAL FIELD

The present invention relates to a drive control method and a drive control system. More particularly, the present invention relates to a drive control method and a drive control system configured to detect a collision of a driven element.

BACKGROUND ART

Conventionally, various proposals for techniques for detecting a collision between a movable part of an industrial robot and an obstacle when the robot performs an operation have been made. For example, Japanese Laid-Open Patent Application Publication No. Hei. 5-208394 discloses a method of detecting a collision based on a disorder of a signal of a torque sensor attached to a motor configured to drive an arm of a robot. Japanese Laid-Open Patent Application Publications Nos. Hei. 8-66893 and 11-70490 disclose a method in which an observer estimates a disturbance torque received by a servo motor configured to drive a robot arm and a collision with an obstacle is detected based on the estimated disturbance torque. Japanese Laid-Open Patent Application Publication No. 8-229864 discloses a method of detecting a collision based on deviation between a position of a movable part which is given as a command by a robot controller and an actual position, in which a theoretical position deviation is calculated based on a delay time of a control system of the robot, and the collision is detected from comparison between the theoretical position deviation and the actual position deviation.

Regarding a process after detecting a collision, Japanese Laid-Open Patent Application Publication No. Hei. 7-143780 discloses a method of, upon detecting the collision, reducing an elapsed time from when the collision is detected until a collided portion of a robot stops by applying a torque to a motor in a reverse direction of a drive direction.

Thus, various proposals for techniques for detecting a collision between a movable part of a robot and an obstacle and techniques for stopping a collided portion of the robot after detecting the collision have been conventionally made. However, in these arts, consideration has not been fully given to inhibition of damage to each element caused by collision. This is due to the fact that, since a state in which the movable part of the robot is pressed against the obstacle continues for a certain time period when the robot is only stopped upon detecting the collision, an impact of the collision is not alleviated, and it is therefore impossible to minimize damage to each element caused by the collision.

In order to solve the problems associated with the arts conventionally proposed, applicant has proposed a drive control method and a drive controller in which a theoretical torque is calculated according to an equation of motion of a robot, then a theoretical current value of a servo motor is calculated from the theoretical torque, and when a difference between the theoretical current value and an actual current value is above a threshold, it is determined that a collision has occurred (Japanese Laid-Open Patent Application Publication No. Hei. 2001-117618).

However, in this prior proposals made by the applicant, the equation of motion must be created and solved for each robot, which requires considerable time. This problem has become serious because of diverse applications of the robot and increasing types of the robot.

In addition, since it is determined that a collision has occurred when the difference between the theoretical current value of the servo motor and the actual current value of the servo motor is above the threshold, this is susceptible to a seasonal effect of viscosity of a lubricant such as grease filled in a joint or the like of a robot arm. For example, in a region where viscosity of grease significantly increases during a winter season, it may be determined incorrectly that a collision has occurred because the difference between the theoretical current value of the servo motor and the actual current value of the servo motor is above the threshold although no collision actually occurs.

DISCLOSURE OF THE INVENTION

The present invention has been directed to solving the above-mentioned problems associated with the prior arts, and an object of the present invention is to provide a drive control method and a drive control system which are capable of accurately detecting a collision of a driven element of a robot or the like which is driven by a driver with a simple construction.

Another object of the present invention is to provide a drive control method and a drive control system which are capable of minimizing a damage to a element caused by a collision.

In order to achieve these objects, a drive control method and a drive controller according to the present invention, which are configured to perform control to cause a driven element to move by a driver, and a collision of the driven element is detected, wherein the collision of the driven element is detected based on an estimated speed deviation which is an estimated deviation from an actual speed of the driven element or an estimated acceleration deviation which is an estimated deviation from an actual acceleration of the driven element. As used herein, "collision" means a collision between the driven element and another object. In accordance with this configuration, since a collision is detected based on the estimated speed deviation or the estimated acceleration deviation, a configuration of the drive controller is simplified and detection precision is improved. In addition, when the drive control method and the drive controller are provided with a collision processing means, a time period required for mounting the collision detecting means into a device to be controlled can be reduced. Further, since it is not necessary to solve an equation of motion, time required for detecting a collision is reduced.

When detecting the collision, the estimated speed deviation or the estimated acceleration deviation may be obtained based on a position command for moving the driven element and a detected value of a position of the driven element.

When detecting the collision, both the estimated speed deviation and the estimated acceleration deviation may be obtained, and the collision may be detected by determining that the collision has occurred when either the estimated speed deviation or the estimated acceleration deviation is above a threshold. Such a configuration allows the collision to be accurately detected.

When detecting the collision, the estimated position of the driven element may be obtained in such a manner that a filter having a time constant equal to a time constant of the driven element under control by the driver filters the position command value, and the estimated speed deviation or the estimated acceleration deviation is obtained based on the obtained estimated position and a detected value of a position of the driven element.

Further, collision processing may be performed to cause the driven element to reverse a movement before the collision, based on detection of the collision. In such a configuration, damage to an element caused by the collision can be minimized. In addition, the device to be controlled can re-start quickly.

In the control, a movement of the driven element may be controlled by the driver based on a first position command, and when processing the collision, positions of the driven element may be sequentially stored, and upon detecting the collision, a second position command to arrange stored positions of the driven element in a reverse direction on a time axis may be generated and used instead of the first position command.

In the control, the driven element may be controlled to continue its current movement, while in the collision processing step, upon detecting the collision, the driven element may be caused to reverse the movement before the collision, after causing the driven element to stop continuation of the current movement by the control. In accordance with this configuration, the driven element can retreat quickly after the collision when the driven element presses against another element.

A drive control method or a drive controller of the present invention comprises a robot drive control method or a robot drive controller, in which a device to be controlled is a robot having the driven element which is an end effecter and the driver. In such a configuration, the present invention is applicable to control of the robot.

Also, the robot may include an arm having a plurality of drivers, an end effecter, and links, the drivers and the links may be interconnected to be alternately placed, from a base end of the arm toward a tip end of the arm, the end effecter may be connected to the driver connected to the link located closest to the tip end, and a portion of the arm which is located closer to the tip end than each driver may form the driven element of the each driver. In such a configuration, the present invention is applicable to control of the robot having the arm.

The above and further objects and features of the invention will more fully be apparent from the following detailed description with accompanying drawings.

BEST MODE FOR CARRYING OUT THE INVENTION

Hereinafter, an embodiment of the present invention will be described with reference to the drawings.

(Embodiment)

Figure 1:
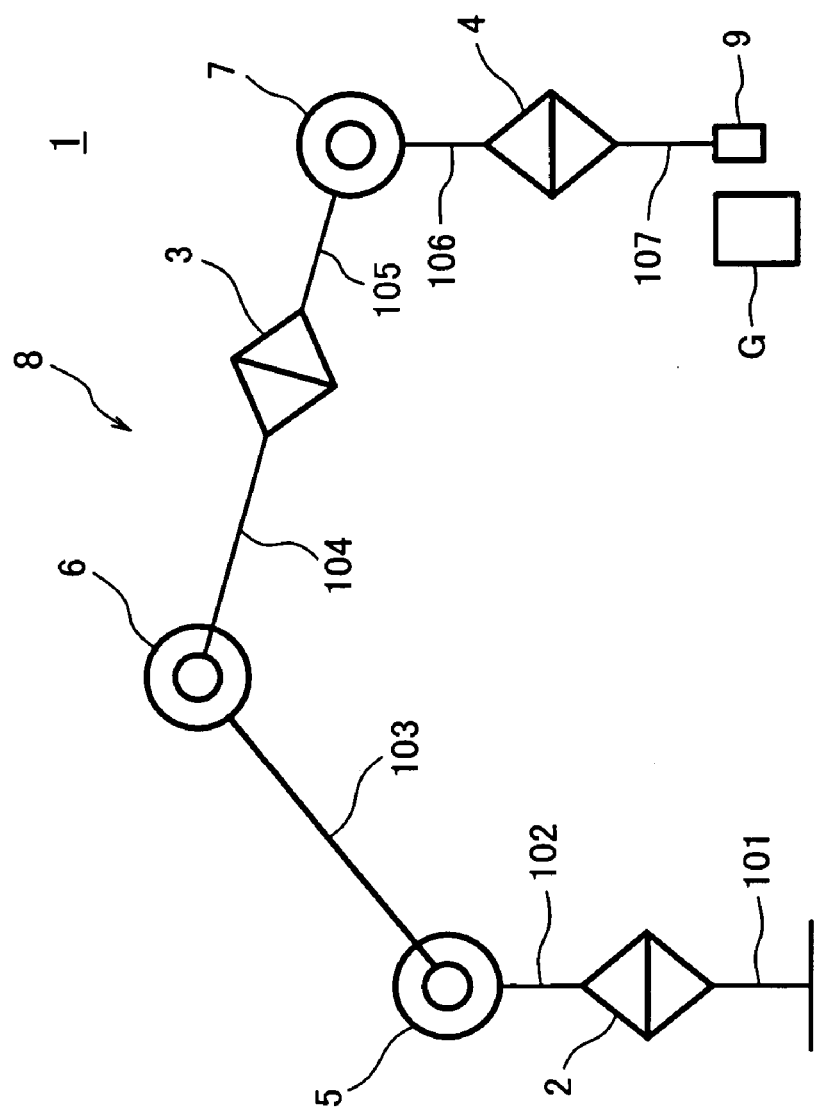
FIG. 1 is a schematic view showing a configuration of a hardware of a robot to be controlled by a drive control system according to an embodiment of the present invention.

FIG. 1 is a schematic view showing a configuration of a hardware of a robot to be controlled by a drive control system according to an embodiment of the present invention. In FIG. 1, the robot is represented by graphic symbols indicating a motion function.

In FIG. 1, a robot 1 has an arm 8 having 6 degrees of freedom and comprised of first, second and third axes 2, 3, and 4 as rotational axes, and fourth, fifth, and sixth axes 5, 6, and 7 as pivot axes. An end effecter 9 is attached to a tip end portion of the arm 8 as a driven element such as a hand or a welding tool. The axes 2, 3, 4, 5, 6, and 7 forming the arm 8 are driven by a servo mechanism including a servo motor (not shown). Specifically, the arm 8 is constructed such that a plurality of links (herein, seven) 101 to 107 are connected to the rotational axes 2, 3, and 4 or the pivot axes 5, 6 and 7, and the end effecter 9 is connected to the link 107 located at a tip end. And, the rotational axes 2, 3, and 4 are each configured to rotate two links connected by itself relatively around their axes. Also, the pivot axes 5, 6, and 7 are each configured to rotate two links connected by itself relatively around axes perpendicular to their axes. This allows the end effecter 9 of the arm 8 to move in a three-dimensional direction and to change its attitude within a predetermined range. As used herein, an element "moves" means "it moves or changes its attitude." In FIG. 1, G denotes an obstacle.

Figure 2:
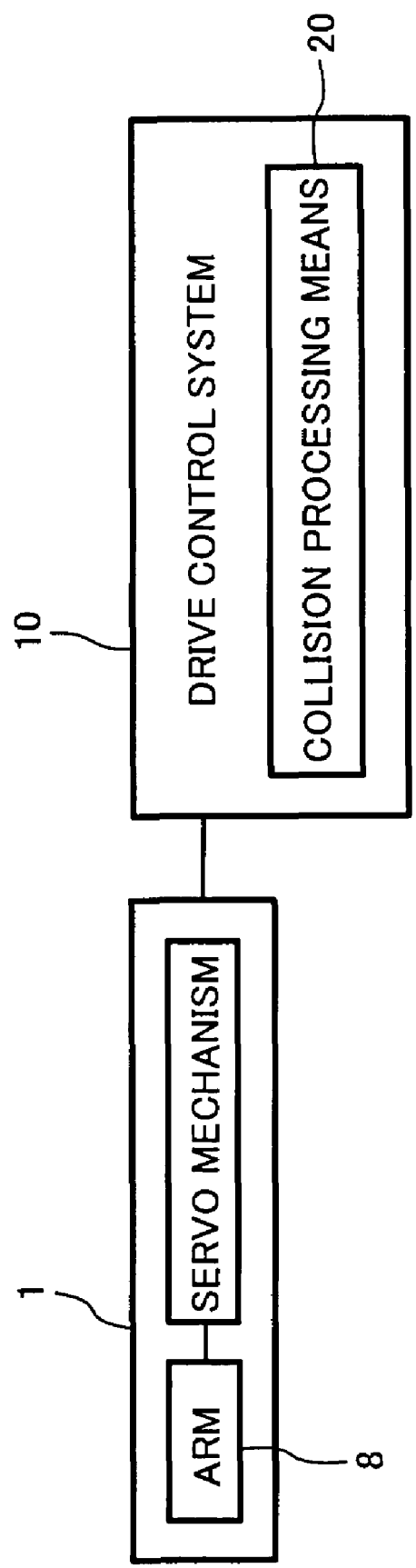
FIG. 2 is a block diagram showing a configuration of a control system of the robot in FIG. 1 and the drive control system of the embodiment.

FIG. 2 is a block diagram showing a configuration of a control system of the robot in FIG. 1 and the drive control system according to this embodiment.

As shown in FIG. 2, the drive control system 10 includes a collision processing means 20, and is configured to control a movement of the arm 8 by the servo mechanism of the robot 1. The drive control system 10 is similar in configuration to a general robot control system, except the collision processing means 20. A main body of the drive control system 10 is constituted by a computer. In this embodiment, the servo mechanism is constituted by servo motors respectively provided in the rotational axes 2, 3, and 4 or the pivot axes 5, 6, and 7 in FIG. 1.

Figure 3:
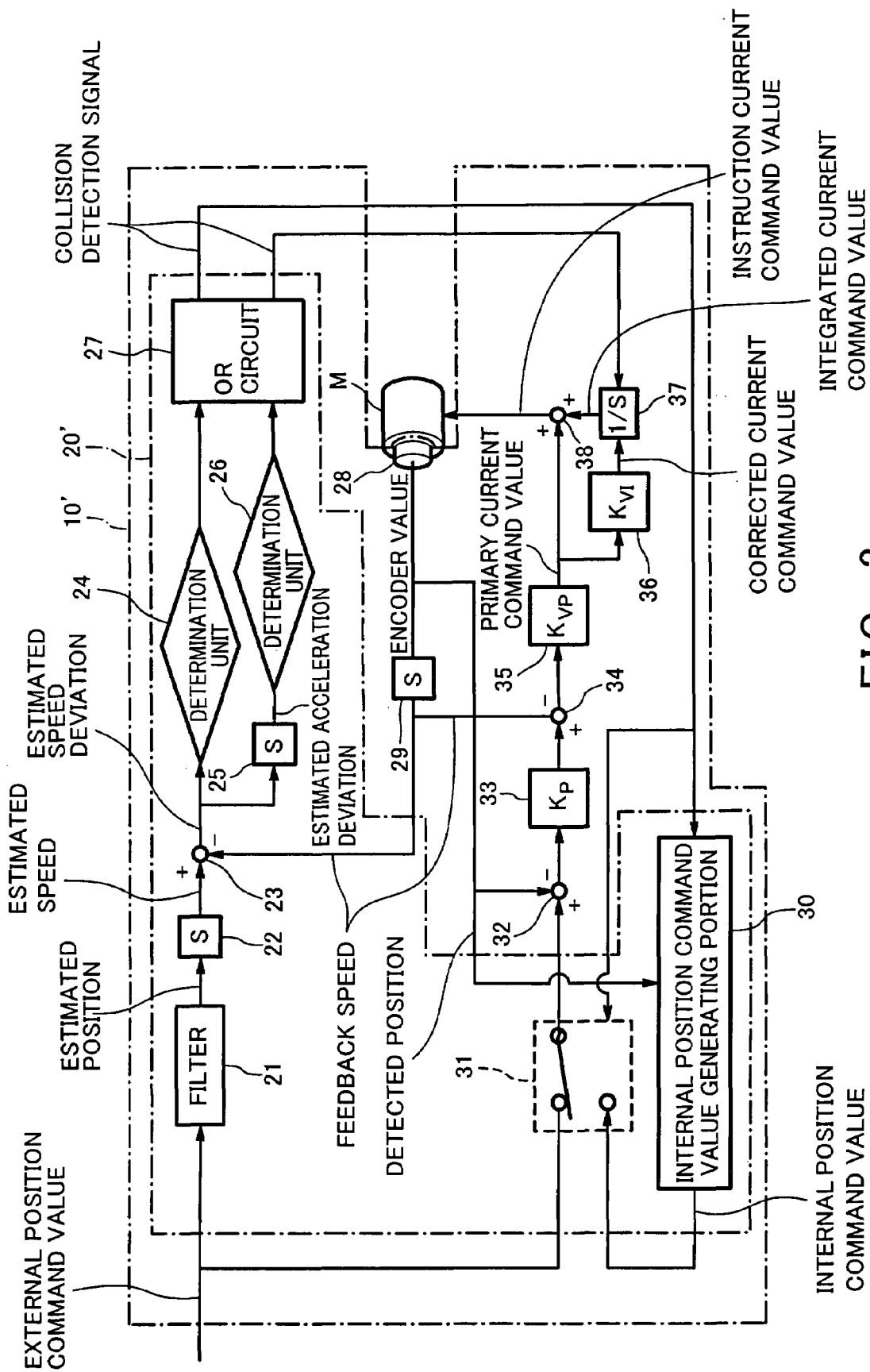
FIG. 3 is a block diagram showing a detailed configuration of the drive control system in FIG. 2.

FIG. 3 is a block diagram showing a detailed configuration of the drive control system in FIG. 2.

In FIG. 3, a drive controller 10' is provided as corresponding to each of a plurality of (in this embodiment, six) servo motors M forming the servo mechanism of the robot 1 in FIG. 2. That is, the drive control system 10 in FIG. 2 has drive controllers 10' in FIG. 3 as many as the servo motors M. And, calculators configured to carry out various calculations (subtraction, differentiation, integration, etc,) shown in FIG. 3 are implemented by software stored in a computer constituting the main body of the drive control system 10. As a matter of course, these calculators may be implemented by a hardware such an electric circuit.

The drive controller 10' includes an encoder (position detector) 28, a third differentiator 29, a second calculator (position deviation calculator) 32, a first proportioner 33, a third calculator (speed deviation calculator) 34, a second proportioner 35, a third proportioner 36, an integrator 37, a fourth calculator 38, and the collision processing means 20'.

First, a configuration of the drive controller 10, other than the collision processing means 20', will be described. The collision processing means 20' includes a switch 31 as described later. To the switch 31, an external position command value (value of a first position command) from the drive control system 10 in FIG. 2 and an internal position command value (value of a second position command) from an internal position command value generating portion 30 to be described later are input. The switch 31 performs switching between the external position command value and the internal position command value which are input, and outputs the signal, based on a signal indicating that a collision has been detected, which will be described later. Meanwhile, the encoder 28 is connected to a main shaft of the servo motor M. The encoder 28 detects a rotational angle (detected position, hereinafter referred to as an encoder value) from a reference position (reference angle) of the servo motor M. The encoder value corresponds to a position of an element driven by the servo motor M (portion of the arm 8 of the robot 1 in FIG. 1 which is located close to a tip end of the arm 8 than the rotational axis or pivot axis corresponding to this servo motor M). The third differentiator 29 calculates an actual speed (real speed: hereinafter, referred to as a feed back speed) by differentiating the encoder value. And, the encoder value and the external position command value or the internal position command value (hereinafter simply referred to as a position command value) output from the switch 31 are input to the second calculator 32. The second calculator 32 calculates a position deviation by subtracting the encoder value from the position command value. The first proportioner 33 multiplies the position deviation by a predetermined number to convert it into a speed. The third calculator 34 calculates a speed deviation by subtracting a feed back speed output from the third differentiator 29 from the converted speed (hereinafter referred to as a conversion speed). The second proportioner 35 multiplies the speed deviation by a predetermined number to convert it into a current command value (hereinafter referred to as a primary current command value). The third proportioner 36 calculates a corrected current command value by multiplying the primary current command value by a predetermined number. The integrator 37 integrates the corrected current command value. The fourth calculator 38 adds the current value integrated by the integrator 37 (hereinafter referred to as an integrated current command value) to a primary current command value. The current command value resulting from addition by the fourth calculator 38 is input to the servo motor M as an instruction current command value. The reason why the primary current command value and the current command value are added to generate the instruction current value is to cause the end effecter 9 to continue its current movement. In other words, the integrator 37 functions as a current movement continuation command value generator. And, by setting this command value to zero, continuation of the current movement is stopped. The first proportioner 33 is configured like a proportioner used in a general robot controller, which converts the position command value into a speed. The second proportioner 35 is configured like a proportioner used in a general robot controller, which converts the converted speed into a current command value.

Subsequently, a configuration of the collision processing means 20' will be described. The collision processing means 20' comprises a filter (estimated position calculator) 21 that has a time constant equal to that of the robot 1 and filters the external position command value input from the drive control system 10, a first differentiator (estimated speed calculator) 22 that calculates a speed (hereinafter referred to as an estimated speed) by differentiating the filtered external position command value (hereinafter referred to as an estimated position), a first calculator (estimated speed deviation calculator) 23 that calculates an estimated speed deviation by subtracting the feedback speed output from the third differentiator 29 from the estimated speed, a first determination unit 24 that determines whether or not the estimated speed deviation is above a threshold, a second differentiator (estimated acceleration deviation calculator) 25 that calculates an estimated acceleration deviation by differentiating the estimated speed deviation, a second determination unit 26 that determines whether or not the estimated acceleration deviation is above a threshold, an OR circuit 27 to which signals from the first and second determination units 24 and 26 are input, an internal position command value generating portion 30 that stores the encoder value and generates the position command value (internal position command value) from the stored encoder value as required, and a switch 31 that performs switching between the external position command value and the internal position command value.

The OR circuit 27 is configured to output an ON signal (signal indicating that a collision has been detected) when the estimated speed deviation or the estimated acceleration deviation is above the threshold. The output signal is input to the integrator 37, the internal position command value generating portion 30, and the switch 31. The reason for using the estimated acceleration deviation is that a collision can be detected earlier because an effect of a collision on an acceleration variation exhibits earlier than that on a speed variation.

Upon the signal indicating that the collision has been detected being input from the OR circuit 27 to the integrator 37, the integrator 37 clears an integrated value. That is, the integrator 37 sets the command value of the current movement continuation command value generator to zero. As a result, a movement of the end effecter 9 toward an object is stopped, and a pressing force applied by the end effecter 9 is alleviated.

Upon the signal indicating that the collision has been detected being input from the OR circuit 27 to the internal position command value generating portion 30, the generating portion 30 outputs a position command value for tracing back the stored positions. That is, the generating portion 30 generates a position command value to cause the arm 8 of the robot 1 to retreat. When there is a limitation on a memory capacity of the internal position command value generating portion 30, the stored position data is in a range of a latest predetermined time period.

Upon the signal indicating that the collision has been detected being input from the OR circuit 27 to the switch 31, the switch 31 switches the position command value from the external position command value to the internal position command value.

Subsequently, an operation of the drive controller 10' configured as described above (drive control method according to this embodiment) will be described.

First of all, an operation in a normal state will be described. With reference to FIGS. 1 to 3, first, the external position command value is output from the drive control system 10. Since the signal indicating that the collision has been detected is not output in the normal state as described later, the switch 31 outputs the external position command value. The second calculator 32, the first proportioner 33, the third calculator 34, the second proportioner 35, the third proportioner 36, the integrator 37, and the forth calculator 38 generate an instruction current value using the external position command value, the encoder value output from the encoder 28, and the feedback speed corresponding to a differentiation value of the encoder value. This instruction current value is input to the servo motor M. Thereby, based on the external command value, the servo motor M is feedback-controlled. As a result, the movement of the arm 8 of the robot 1 is controlled by the drive control system 10 by the servo mechanism.

Meanwhile, the external position command value is input to the filter 21 and converted into the estimated position. The first differentiator 22 calculates the estimated speed by differentiating the estimated position. The first calculator 22 calculates the estimated speed deviation using this estimated speed and the feedback speed. The second differentiator 25 calculates the estimated acceleration deviation by differentiating the estimated speed deviation. And, the first determination unit 24 determines whether or not the calculated estimated speed deviation is above the threshold. Herein, since the arm 8 of the robot 1 moves to conform to the external command value, the estimated speed deviation is small. From this, the first determination unit 24 determines that the estimated speed deviation is not above the threshold. And, the second determination unit 26 determines whether or not the calculated estimated acceleration deviation is above the threshold. Herein, since the arm 8 of the robot 1 moves to conform to the external command value, the estimated acceleration deviation is small. From this, the second determination unit 26 determines that the estimated acceleration deviation is not above the threshold. Therefore, the OR circuit 27 does not output a signal indicating that a collision has been detected.

Subsequently, an operation in occurrence of a collision will be described. Here, it is assumed that the end effecter 9 of the robot 1 has collided against an obstacle G. Under this condition, the arm 8 moves not to conform to the external command value, and therefore, the estimated speed deviation calculated by the first calculator 23 and the estimated acceleration deviation calculated by the second differentiator 25 become large. From this, the first determination unit 24 determines that the estimated speed deviation is above the threshold. And, the second determination unit 26 determines that the estimated acceleration deviation is above the threshold. So, the OR circuit 27 outputs the signal indicating that the collision has been detected. The signal is input to the integrator 37, which outputs zero. Thereby, the pressing force applied by the end effecter 9 against the obstacle G is alleviated. Also, the signal is input to the internal position command value generating portion 30, which outputs an internal position command value. Further, the signal is input to the switch 31, which outputs the internal command value. Thereby, the servo motor M reverses a movement before collision. Consequently, the end effecter 9 of the robot 1 quickly retreats and moves away from the obstacle G.

As thus far described, in accordance with this embodiment, since it is determined that a collision has occurred when the estimated speed deviation or the estimated acceleration deviation is above the corresponding threshold, the configuration of the drive control system 10 is simplified while improving detection precision. In addition, a period required for mounting the collision processing means 20 into the robot 1 can be reduced. Further, since it is not necessary to solve an equation of motion, time required for detecting collision can be reduced. Further, upon detecting the collision, the integrator 37 clears its content to cause the end effecter 9 toward the obstacle G to stop movement. Besides, since the robot 1 retreats after the collision, the robot 1 can re-start quickly.

While description has been given of a case where the end effecter 9 of the robot 1 collides against the obstacle G, the robot 1 moves in the same manner when a portion of the arm 8 of the robot 1 which is located closer to the tip end than the link 102 collides against the obstacle G, because the collision processing means 20' is provided for each servo motor M.

While description has been thus far given of the present invention in terms of the embodiments, it is to be understood that such embodiment is not to be interpreted as limiting, but various alternations may be made. For example, while both the estimated speed deviation and the estimated acceleration deviation are used to detect a collision in this embodiment, either the estimated speed deviation or the estimated acceleration deviation may be used to detect the collision. In that case, the configuration of the drive control system is further simplified.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A drive control system of the present invention is useful as a robot control system.

A drive control method of the present invention is useful as a drive control method of a robot.

The invention claimed is:

1. A drive controller comprising:
   a control means configured to detect a position of a driven element and to perform feedback control to cause the driven element to move by a driver based on a position command and the detected position;
   a collision detecting means configured to detect a collision of the driven element; and
   a collision processing means, wherein
   the control means controls the driven element by the driver to cause the driven element to continue its current movement, by adding a first control signal for feedback control of movement of the driven element to a second control signal for continuing the current movement of the driven element and by inputting the added signal to the driver, in addition to the feedback control of the movement of the driven element,
   the collision detecting means detects the collision of the driven element based on an estimated speed deviation which is an estimated deviation from an actual speed of the driven element or an estimated acceleration deviation which is an estimated deviation from an actual acceleration of the driven element, and
   the collision processing means causes the driven element to reverse a movement before the collision after causing the driven element to stop continuation of the current movement by the control means by setting a value of the second control signal to zero, based on a signal indicating that a collision has been detected.

2. The drive controller according to claim 1, wherein the collision detecting means obtains the estimated speed deviation or the estimated acceleration deviation based on the position command and the detected position.

3. The drive controller according to claim 2, wherein the collision detecting means obtains both the estimated speed deviation and the estimated acceleration deviation, and detects the collision by determining that the collision has occurred when either the estimated speed deviation or the estimated acceleration deviation is above a corresponding threshold.

4. The drive controller according to claim 1, wherein the collision detecting means obtains the estimated position of the driven element in such a manner that a filter having a time constant equal to a time constant of the driven element under control by the driver filters the position command value to allow the estimated position of the driven member to be obtained, and obtains the estimated speed deviation or the estimated acceleration deviation based on the obtained estimated position and the detected position.

5. The drive controller according to claim 1, wherein
the control means controls a movement of the driven element by the driver based on a first position command, and
the collision processing means includes a position storage means configured to sequentially store positions of the driven element, and a second position command generating means configured to generate a second position command for arranging the stored positions of the driven element in a reverse direction on a time axis and to input the second position command to the control means instead of the first position command, upon receiving the signal indicating that the collision has been detected.

6. A drive control system comprising a robot controller including a drive controller according to claim 1 wherein a device to be controlled is a robot, and wherein the driven element is an end effecter and the driver.

7. The drive controller according to claim 1, wherein a device to be controlled comprises a robot including a plurality of said drive controllers, wherein
the robot includes an arm having drivers corresponding to the plurality of drive controllers, an end effecter, and links, the drivers and the links being interconnected to be alternately placed, from a base end of the arm toward a tip end of the arm, and the end effecter being connected to the driver connected to the link located closest to the tip end of the arm, and
a portion of the arm which is located closer to the tip end than each driver forms the driven element of each driver.

8. The drive controller according to claim 1, wherein the control means performs feedback control of the position and a speed of the driven element to perform feedback control of the movement, outputs the first control signal as a control signal for feedback control of the speed, and integrates a signal based on the first control signal to generate the second control signal.

9. A drive control method comprising the steps of:
performing feedback control by detecting a position of a driven element and by causing the driven element to move by a driver based on a position command and the detected position;
detecting a collision of the driven element; and
processing the collision,
wherein in the step of performing control, the driven element is controlled by the driver to cause the driven element to continue its current movement by adding a first control signal for feedback control of movement of the driven element to a second control signal for continuing the current movement of the driven element and by imputing the added signal to the driver, in addition to the feedback control of the driven element,
in the step of detecting the collision, the collision of the driven element is detected based on an estimated speed deviation which is an estimated deviation from an actual speed of the driven element or an estimated acceleration deviation which is an estimated deviation from an actual acceleration of the driven element, and
in the step of processing the collision, the driven element is caused to reverse a movement before collision after causing the driven element to stop continuation of the current movement in the control step by setting a value of the second control signal to zero, based on a signal indicating that a collision has been detected.

10. The drive control method according to claim 9, wherein in the step of detecting the collision, the estimated speed deviation or the estimated acceleration deviation is obtained based on the position command and the detected position.

11. The drive control method according to claim 10, wherein in the step of detecting the collision, both the estimated speed deviation and the estimated acceleration deviation are obtained, and the collision is detected by determining that the collision has occurred when either the estimated speed deviation or the estimated acceleration deviation is above a corresponding threshold.

12. The drive control method according to claim 9, wherein in the step of detecting the collision, a filter having a time constant equal to a time constant of the driven element under control by the driver filters the position command value to allow an estimated position of the driven element to be obtained, and based on the obtained estimated position and the detected position, the estimated speed deviation or the estimated acceleration deviation is obtained.

13. The drive control method according to claim 9, wherein
in the control step, movement of the driven element is controlled by the driver based on a first position command, and
the step of processing the collision includes sequentially storing positions of the driven element, and, upon detecting the collision, generating a second position command to arrange the stored positions of the driven element in a reverse direction on a time axis and using the second position command instead of the first position command in the control step.

14. A drive control method comprising a robot drive control method including the drive control method according to claim 9 in which a device to be controlled is a robot, wherein the driven element is an end effecter and the driver.

15. The drive control method according to claim 9 for controlling a robot including a plurality of said drive control methods, wherein
the robot includes an arm having drivers corresponding to the plurality of drive control methods, an end effecter, and links, the drivers and the links being interconnected to be alternately placed, from a base end of the arm toward a tip end of the arm, and the end effecter being connected to the driver connected to the link located closest to the tip end of the arm, and
a portion of the arm which is located closer to the tip end than each driver forms the driven element of each driver.

16. The drive control method according to claim 9, wherein in the step of performing control, the position and a speed of the driven element is feedback controlled to perform feedback control of the movement, the first control signal is output as a control signal for feedback control of the speed, and a signal based on the first control signal is integrated to generate the second control signal.

* * * * *